(12) United States Patent
Ikai et al.

(10) Patent No.: US 12,304,516 B2
(45) Date of Patent: May 20, 2025

(54) ACCELERATION SUPPRESSION APPARATUS

(71) Applicant: TOYOTA JIDOSHA KABUSHIKI KAISHA, Toyota (JP)

(72) Inventors: Masaki Ikai, Toyota (JP); Masashi Oishi, Toyota (JP); Takuya Kaminade, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 188 days.

(21) Appl. No.: 18/089,996

(22) Filed: Dec. 28, 2022

(65) Prior Publication Data

US 2023/0227039 A1 Jul. 20, 2023

(30) Foreign Application Priority Data

Jan. 14, 2022 (JP) .................................. 2022-004284

(51) Int. Cl.
*B60W 50/08* (2020.01)
*B60W 10/04* (2006.01)
(Continued)

(52) U.S. Cl.
CPC .......... *B60W 50/087* (2013.01); *B60W 10/04* (2013.01); *B60W 10/18* (2013.01); *B60W 30/18027* (2013.01); *B60W 50/08* (2013.01); *B62D 15/027* (2013.01); *B60W 2520/10* (2013.01); *B60W 2540/10* (2013.01);
(Continued)

(58) Field of Classification Search
None
See application file for complete search history.

(56) References Cited

U.S. PATENT DOCUMENTS 10,160,462 B2 * 12/2018 Ohta ..................... B60W 50/14
11,001,255 B2 5/2021 Fukuman et al.
(Continued)

FOREIGN PATENT DOCUMENTS

CN 106660556 A * 5/2017 ............. B60R 21/00
CN 106660556 B * 10/2018 ............. B60R 21/00
(Continued)

*Primary Examiner* — Kevin R Steckbauer
(74) *Attorney, Agent, or Firm* — Sughrue Mion, PLLC

(57) ABSTRACT

Provided is an acceleration suppression apparatus having improved practicality. The acceleration suppression apparatus includes: an in-vehicle sensor (20) configured to acquire information relating to a position of an own vehicle and information relating to an operation of an operating element of the own vehicle to output the acquired information; and a parking assist ECU (10) configured to execute, based on the information acquired from the in-vehicle sensor (20), acceleration suppression control for suppressing acceleration of the own vehicle by controlling at least one of a drive device (30) or a braking device (40) mounted on the own vehicle. The parking assist ECU (10) is configured to execute the acceleration suppression control when, in a situation in which the own vehicle is positioned in a predetermined region including a parking space, a traveling mode of the own vehicle matches a predetermined mode defined in advance as a traveling mode when the own vehicle is being parked in the parking space.

5 Claims, 15 Drawing Sheets

(51) Int. Cl.
   *B60W 10/18*   (2012.01)
   *B60W 30/18*   (2012.01)
   *B62D 15/02*   (2006.01)

(52) U.S. Cl.
   CPC ..... *B60W 2540/12* (2013.01); *B60W 2556/10* (2020.02); *B60W 2720/106* (2013.01)

(56) References Cited

U.S. PATENT DOCUMENTS

| | | | |
|---|---|---|---|
| 11,117,569 B2* | 9/2021 | Luo | B60W 60/001 |
| 11,407,417 B2* | 8/2022 | Mizoguchi | B60W 30/146 |
| 11,628,864 B2* | 4/2023 | Mizoguchi | G01C 21/32 |
| | | | 701/25 |
| 11,972,686 B2* | 4/2024 | Mukaiyama | B60W 30/06 |
| 11,972,687 B2* | 4/2024 | Mukaiyama | G08G 1/146 |
| 12,073,722 B2* | 8/2024 | Baba | G06V 20/586 |
| 2017/0203769 A1* | 7/2017 | Ohta | B60W 50/14 |
| 2021/0039665 A1 | 2/2021 | Kaminade et al. | |
| 2021/0046935 A1* | 2/2021 | Mizoguchi | B60W 30/045 |
| 2021/0053589 A1* | 2/2021 | Mizoguchi | B60W 60/0025 |
| 2023/0169861 A1* | 6/2023 | Baba | B60W 40/105 |
| | | | 340/932.2 |
| 2023/0227039 A1* | 7/2023 | Ikai | B60W 10/18 |
| | | | 701/70 |
| 2024/0092346 A1* | 3/2024 | Ishii | B60W 50/08 |
| 2024/0109412 A1* | 4/2024 | Matsunaga | B60K 28/02 |

FOREIGN PATENT DOCUMENTS

| | | | | | |
|---|---|---|---|---|---|
| DE | 112015003197 T5 | * | 3/2017 | ............ | B60R 21/00 |
| JP | 2012118798 A | * | 6/2012 | ............ | B60W 10/08 |
| JP | 2015104982 A | * | 5/2015 | | |
| JP | 2021-049981 A | | 4/2021 | | |
| JP | 7344044 B2 | * | 9/2023 | ......... | B60K 31/0008 |

* cited by examiner

ACCELERATION SUPPRESSION APPARATUS

BACKGROUND OF THE INVENTION

1. Field of the Invention

The present invention relates to an acceleration suppression apparatus for suppressing acceleration of a vehicle in a predetermined situation.

2. Description of the Related Art

Hitherto, there has been proposed an acceleration suppression apparatus (hereinafter referred to as "related-art apparatus") capable of executing acceleration suppression control for suppressing sudden acceleration of an own vehicle when a driver erroneously depresses an accelerator pedal deeply (see, for example, Japanese Patent Application Laid-open No. 2021-49981).

The related-art apparatus executes acceleration suppression control based on a depression depth of the accelerator pedal and a change in the depression depth of the accelerator pedal. Therefore, acceleration suppression control may be executed even when the driver is intentionally trying to accelerate the own vehicle, and the driver may find such control annoying. For example, when the related-art apparatus is used, unrequired acceleration suppression control may be frequently executed at the time of starting a vehicle at an intersection, and the driver may find such control annoying.

SUMMARY OF THE INVENTION

One object of the present invention is to provide an acceleration suppression apparatus having improved practicality.

In order to solve the above-mentioned problem, according to at least one embodiment of the present invention, there is provided an acceleration suppression apparatus (1) including: an in-vehicle sensor (20) configured to acquire information relating to a position of an own vehicle and information relating to an operation of an operating element of the own vehicle to output the acquired information; and a control device (10) configured to execute, based on the information acquired from the in-vehicle sensor, acceleration suppression control for suppressing acceleration of the own vehicle by controlling at least one of a drive device (30) or a braking device (40) mounted on the own vehicle. The control device is configured to execute the acceleration suppression control when, in a situation in which the own vehicle is positioned in a predetermined region (PR) including a parking space (P0), a traveling mode (α, vs) of the own vehicle matches a predetermined mode defined in advance as a traveling mode when the own vehicle is being parked in the parking space.

Execution of acceleration suppression control is permitted in a case in which the traveling mode when the vehicle (own vehicle) to which the acceleration suppression apparatus according to the at least one embodiment of the present invention is applied is traveling in a predetermined region matches a mode defined in advance as a traveling mode when the own vehicle is being parked (a typical traveling mode during parking). That is, for example, even when the driver erroneously depresses the accelerator pedal deeply, the own vehicle hardly accelerates. Conversely, execution of acceleration suppression control is not permitted when the traveling mode of the own vehicle is different from the mode defined in advance. That is, when the driver depresses the accelerator pedal deeply, the own vehicle accelerates in accordance with the depression depth. For example, the control device is capable of executing acceleration suppression control when it is estimated that the driver is performing a parking operation, and is not capable of executing acceleration suppression control when it is estimated that the driver is not performing a parking operation (for example, when the own vehicle is passing along a nearby road, or the own vehicle is traveling a road after exiting a parking space). That is, the parking assist apparatus according to the at least one embodiment of the present invention switches between a state in which acceleration suppression control can be executed and a state in which acceleration suppression control cannot be executed in accordance with the situation. Therefore, the acceleration suppression apparatus according to the at least one embodiment of the present invention is more practical than the related-art apparatus in which acceleration suppression control is executed simply based on the depression depth of the accelerator pedal regardless of the situation of the own vehicle.

In the acceleration suppression apparatus according to one aspect of the present invention, the control device is configured to: store a distribution map (PM) of any one or both of a direction in which the own vehicle is advancing when the own vehicle is being parked in the predetermined region and a speed of the own vehicle in the predetermined region; and execute the acceleration suppression control when any one or both of a current direction (α) in which the own vehicle is advancing and a current speed (vs) of the own vehicle which are acquired from the in-vehicle sensor are included in a predetermined range of the distribution map.

According to this aspect, the control device can relatively easily determine whether or not to execute acceleration suppression control based on the distribution map of any one or both of the direction in which the own vehicle is advancing and the speed of the own vehicle.

In the acceleration suppression apparatus according to another aspect of the present invention, the control device is configured to generate the distribution map based on a history of any one or both of the direction in which the own vehicle is advancing in the predetermined region and the speed of the own vehicle traveling in the predetermined region.

According to this aspect, for example, the characteristics of the parking region (specifically, positional relationship between the parking space and the road) and the characteristics of the driving operation of the driver during parking can be reflected in the distribution map.

DESCRIPTION OF THE EMBODIMENTS

Outline of Configuration

Figure 1:
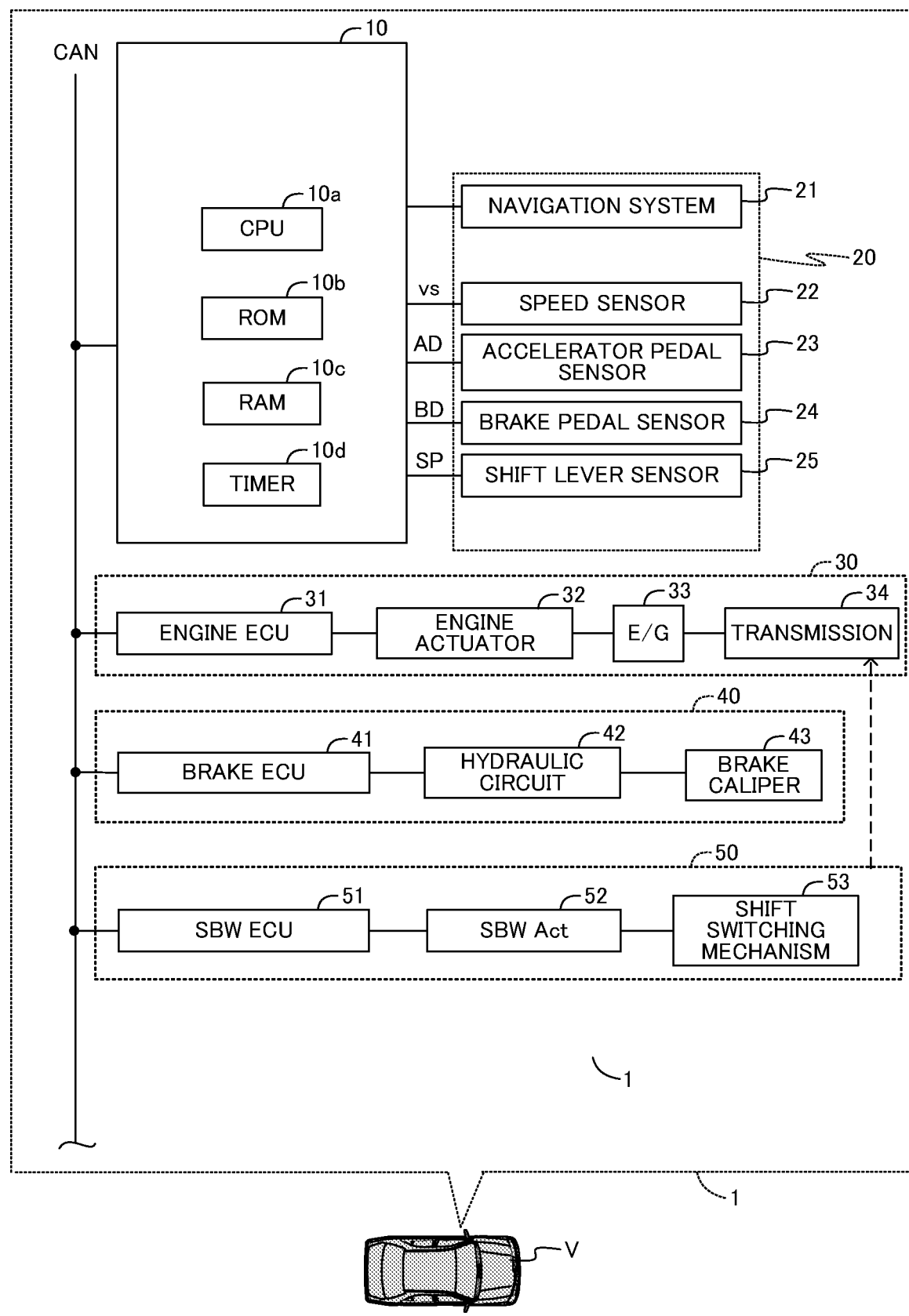
FIG. 1 is a block diagram of a parking assist apparatus according to at least one embodiment of the present invention.

As illustrated in FIG. 1, a parking assist apparatus 1 (acceleration suppression apparatus) according to at least one embodiment of the present invention is mounted on a vehicle V having an automatic driving function. The parking assist apparatus 1 suppresses the acceleration of the vehicle V when a predetermined condition is satisfied, as described later in detail. This control is hereinafter referred to as "acceleration suppression control." Further, in the following description, the vehicle V may be referred to as "own vehicle."

Specific Configuration

As illustrated in FIG. 1, the parking assist apparatus 1 includes a parking assist ECU 10, in-vehicle sensors 20, a drive device 30, a braking device 40, and a shift switching device 50.

The parking assist ECU 10 includes a microcomputer including, for example, a CPU 10a, a ROM 10b (rewritable non-volatile memory), a RAM 10c, and a timer 10d. As used herein, "ECU" means an electronic control unit, and the ECU includes a microcomputer including, for example, a CPU, a RAM, and a ROM. The CPU implements various functions by executing instructions stored in the ROM.

The parking assist ECU 10 is connected to other ECUs (such as engine ECU 31, brake ECU 34, and SBW ECU 51 described later) via a controller area network (CAN) in a manner that enables information to be transmitted and received to and from each other.

The in-vehicle sensors 20 include a navigation system 21. The navigation system 21 receives GPS signals from a plurality of artificial satellites, and detects, for example, a current position PV (latitude and longitude) of the vehicle V and the direction in which the vehicle V is advancing based on the received plurality of GPS signals.

Further, the in-vehicle sensors 20 include a sensor which acquires information relating to a travel state of the vehicle V (such as speed, acceleration, and operation mode of an operating element).

Specifically, the in-vehicle sensors 20 include a speed sensor 22, an accelerator pedal sensor 23, a brake pedal sensor 24, and a shift lever sensor 25.

The vehicle speed sensor 22 includes a wheel speed sensor which generates one pulse signal (wheel pulse signal) each time the wheel of the own vehicle rotates by a predetermined angle. The vehicle speed sensor 22 measures the number of pulses of the wheel pulse signal transmitted from the wheel speed sensor in unit time, calculates a rotation speed (wheel speed) of each wheel based on the measured number of pulses, and calculates a vehicle speed vs (actual vehicle speed) of the own vehicle based on the wheel speed of each wheel. The vehicle speed sensor 22 transmits data representing the vehicle speed vs to the parking assist ECU 10.

The accelerator pedal sensor 23 detects a depression depth AD of the accelerator pedal (not shown) of the vehicle V. The accelerator pedal sensor 23 transmits data representing the depression depth AD of the accelerator pedal to the parking assist ECU 10.

The brake pedal sensor 24 detects a depression depth BD of a brake pedal (not shown) of the vehicle V. The brake pedal sensor 24 transmits data representing the depression depth BD of the brake pedal to the parking assist ECU 10.

The shift lever sensor 25 detects a position (shift lever position SP) of a shift lever (not shown) of the vehicle V. The shift lever sensor 25 transmits data representing the shift lever position SP to the parking assist ECU 10.

The in-vehicle sensors 20 also include various switches (for example, a switch for detecting an operation state of a direction indicator operating lever) included in the vehicle V.

The drive device 30 generates a driving force, and applies the driving force to drive wheels out of wheels (left front wheel, right front wheel, left rear wheel, and right rear wheel). The drive device 30 includes, for example, an engine ECU 31, an engine actuator 32, an internal combustion engine 33, a transmission 34, and a driving force transmission mechanism (not shown) which transmits a driving force to the wheels. The engine ECU 31 is connected to the engine actuator 32. The engine actuator 32 includes a throttle valve actuator which changes an opening degree of a throttle valve of the internal combustion engine 33. The engine ECU 31 acquires the depression depth AD of the accelerator pedal from the parking assist ECU 10. The engine ECU 31 drives the engine actuator 32 in accordance with the depression depth AD acquired from the parking assist ECU 10. In this way, the torque generated by the internal combustion engine 33 is controlled. The torque generated by the internal combustion engine 33 is transmitted to the drive wheels via the transmission 34 and the driving force transmission mechanism (for example, a drive shaft).

When the vehicle V to which the parking support device 1 is applied is a hybrid electric vehicle (HEV), the engine ECU 31 can control the driving force of the vehicle generated by any one or both of "an internal combustion engine and an electric motor" serving as a vehicle drive source. Further, when the vehicle V to which the parking assist apparatus 1 is applied is a battery electric vehicle (BEV), an electric motor ECU which controls the driving force of the vehicle generated by an "electric motor" serving as the vehicle drive source may be used instead of the engine ECU 31.

The braking device 40 applies a braking force to the wheels. The braking device 40 includes a brake ECU 41, a hydraulic circuit 42, and a brake caliper 43. The hydraulic circuit 42 includes, for example, a reservoir, an oil pump, various valve devices, and a hydraulic sensor (which are not shown). The brake caliper 43 is a hydraulic actuator including a cylinder and a piston. When oil is supplied to the cylinder, the piston is pushed out of the cylinder. A brake pad is arranged at the tip of the piston, and the brake pad is pressed against a brake disc. The brake ECU 41 acquires the depression depth BD of the brake pedal from the parking assist ECU 10. The brake ECU 41 transmits a hydraulic pressure control command to the hydraulic circuit 42 in accordance with the depression depth BD acquired from the parking assist ECU 10. The hydraulic circuit 42 adjusts the hydraulic pressure in the cylinder of the brake caliper 43 in accordance with the hydraulic control command acquired from the brake ECU 41. In this way, the braking force of the wheels (brake discs) by the brake caliper 43 is controlled.

The shift switching device 50 switches a shift position of the transmission 34. The shift switching device 50 includes, for example, the shift-by-wire (SBW) ECU 51, an SBW actuator 52, and a shift switching mechanism 53. The SBW ECU 51 is connected to the SBW actuator 52. The SBW ECU 51 acquires the shift lever position SP from the parking assist ECU 10. The parking assist ECU 10 can appropriately correct the shift lever position SP acquired from the shift lever sensor 25 and transmit the corrected shift lever position SP to the SBW ECU 51. The SBW ECU 51 transmits a shift switching command to the SBW actuator 52 in accordance with the shift lever position SP acquired from the parking assist ECU 10. The SBW actuator 52 controls the shift switching mechanism 53 in accordance with the shift switching command acquired from the SBW ECU 51. In this way, the shift position of the transmission 34 is switched.

Operation

Next, parking assist control (acceleration suppression control) executed by the parking assist ECU 10 of the parking assist apparatus 1 is described. Within a predetermined parking region PR, the parking assist ECU 10 can appropriately correct the depression depth AD acquired from the accelerator pedal sensor 23, and transmit the corrected depression depth AD to the engine ECU 31. For example, when an increase per unit time in the depression depth AD acquired from the accelerator pedal sensor exceeds a predetermined threshold value, the parking assist ECU 10 can transmit a value smaller than the depression depth AD acquired from the accelerator pedal sensor 23 to the engine ECU 31. Further, the parking assist ECU 10 can appropriately correct the depression depth BD acquired from the brake pedal sensor 24, and transmit the corrected depression depth BD to the brake ECU 41. For example, when the acceleration (or change in acceleration) of the own vehicle exceeds a predetermined threshold value, the parking assist ECU 10 can transmit a value larger than the depression depth BD acquired from the brake pedal sensor 24 to the brake ECU 41. This control is hereinafter referred to as "acceleration suppression control." This control suppresses sudden acceleration by the own vehicle.

The following first to third situations can be considered as situations of the own vehicle in a predetermined region including a parking space P0 of the own vehicle and the region surrounding the predetermined region. The first situation is a situation in which the own vehicle is traveling outside the parking region PR. For example, the first situation corresponds to a situation in which the own vehicle is traveling at a relatively high speed toward the parking region PR. The second situation is a situation in which the driver is executing a parking operation inside the parking region PR. For example, the second situation corresponds to a situation in which the driver is driving the own vehicle forward or backward (reversing) at a relatively low speed in order to park the own vehicle in the parking space P0. The third situation is a situation in which the vehicle is parked in the parking space P0. The third situation corresponds to a situation in which the speed vs is "0" and the shift lever position SP is "P."

The parking assist ECU 10 estimates the situation of the own vehicle, as described later in detail. Then, the parking assist ECU 10 switches the operation mode of the parking assist ECU 10 based on a result of the estimation (hereinafter referred to as "operation mode switching control"). That is, the operation mode of the parking assist apparatus 1 (parking assist ECU 10) is, in principle, an "acceleration suppression prohibited mode" (hereinafter simply referred to as "prohibited mode") in which acceleration suppression control cannot be executed, but when a predetermined condition is satisfied, the mode is switched to an "acceleration suppression permitted mode" (hereinafter simply referred to as "permitted mode") in which acceleration suppression control can be executed.

Advance Preparation

As described below, the parking assist ECU 10 acquires data identifying the parking region PR as advance preparation for executing the operation mode switching control, and also generates a parking operation determination map PM to be used for estimating the situation of the own vehicle.

Setting of Parking Region

Figure 2:
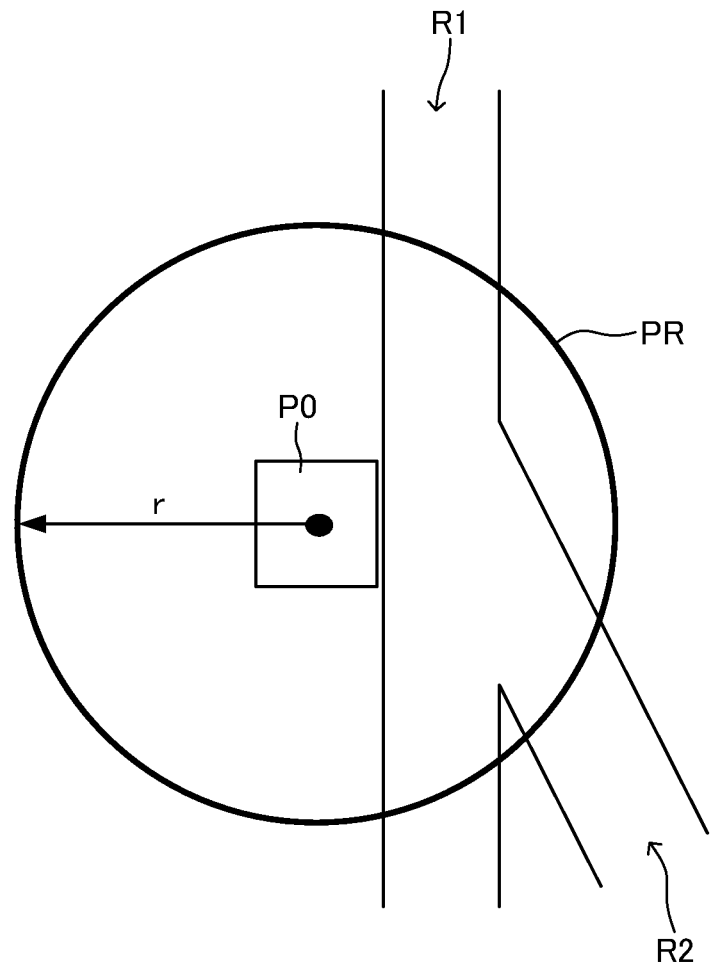
FIG. 2 is a plan view for illustrating a parking region.

The driver can register the parking region PR by parking the own vehicle and pressing an operation switch (not shown). That is, when the parking assist ECU 10 detects that the own vehicle is parked (speed vs is "0" and the shift lever position is "P") and that the operation switch has been pressed, the parking assist ECU 10 acquires the current position (latitude and longitude) of the own vehicle from the navigation system 21, and, as illustrated in FIG. 2, stores a circular region having a radius "r" centered on the current position as the parking region PR in the ROM 10b. In a case in which the region near the current position has already been registered as the parking region PR, the parking assist ECU 10 causes a display device to display a predetermined image indicating that the registered parking region PR exists, and causes an audio device to output predetermined speech. The driver can select whether or not to update the parking region PR by operating an operating element (not shown).

Acquisition of Travel Data

When the parking assist ECU 10 detects that the own vehicle has entered the parking region PR based on the information acquired from the in-vehicle sensors 20, the parking assist ECU 10 detects a direction α in which the own vehicle is advancing and a speed vs of the own vehicle each time a predetermined period elapses based on the information acquired from the in-vehicle sensors 20. Then, the parking assist ECU 10 stores the detected direction α and speed vs at each time point "t" in the RAM 10c as travel data D[t] (=(α, vs)). When the own vehicle is parked in the parking region PR (when the own vehicle has transitioned to the third situation), the parking assist ECU 10 stores, in the ROM 10b, each piece of travel data D[t] stored in the RAM 10c as a parking log D1. Meanwhile, when the own vehicle enters the parking region PR but then exits the parking region PR without being parked (when the own vehicle has not transitioned to the third situation), the parking assist ECU 10 stores, in the ROM 10b, each piece of travel data D[t] stored in the RAM 10c as a passage log D2. In this way, the pieces of travel data D[t] forming the parking log D1 and the passage log D2 are accumulated in the ROM 10b. The travel data D[t] is composed of the direction and speed of the own vehicle, and does not include the position (latitude and longitude) of the own vehicle. Moreover, the parking assist ECU 10 acquires the travel data D[t] only when the own vehicle is moving forward. That is, for example, the parking assist ECU 10 does not acquire travel data D[t] in a situation in which the driver is reversing the own vehicle in order to reverse park the own vehicle. Further, when the driver parks the own vehicle facing forward, the parking assist ECU 10 does not acquire the travel data D[t] in a situation in which the own vehicle is temporarily reversed in order to adjust the attitude of the own vehicle with respect to the parking space.

Description of specific examples (first to fourth examples) of the travel data D[t] is now given with reference to FIG. 3A to FIG. 6B. In those examples, a road R1 extends north to south, a parking space P0 (garage) exists on the west side of the road R1, and the parking region PR is set around the parking space P0. A road R2 extends southeast from the vicinity of the parking space P0. That is, one end of the road R2 is connected to the road R1 near the parking space P0.

First Example

There is now given description of pieces of travel data D[t1], D[t2], and D[t3] acquired in the process of the own vehicle traveling in a northerly direction from the south of the parking region PR, entering the parking region PR, and then being reverse parked in the parking space P0 (a case in which the situation transitions from the first situation to the third situation).

Figure 3A:
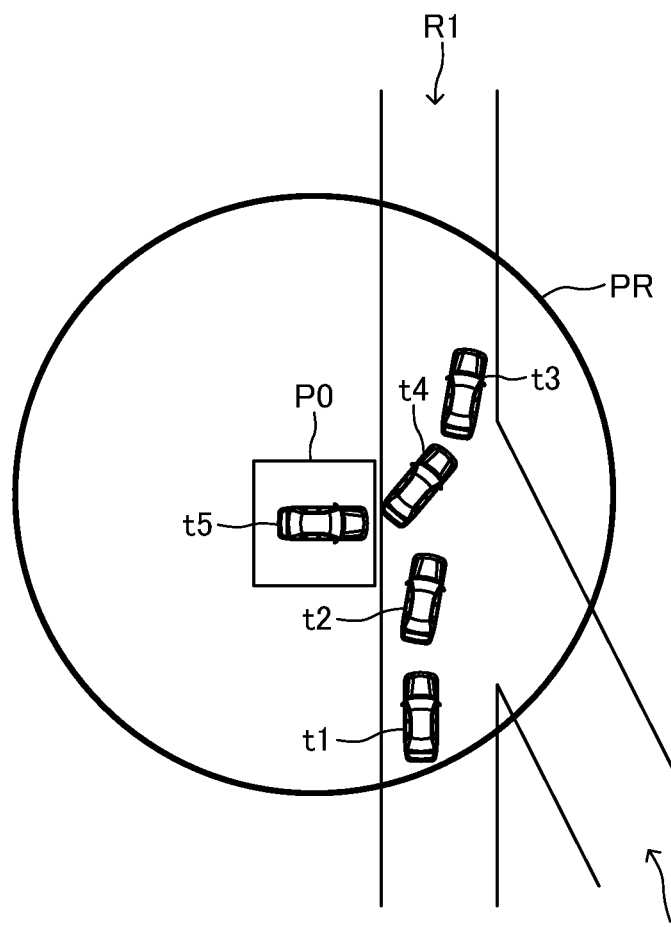
FIG. 3A is a plan view for illustrating an example in which an own vehicle has reached a parking space.

As illustrated in FIG. 3A, at a time point t1 immediately after the own vehicle enters the parking region PR, the own vehicle is moving forward in the northerly direction at a relatively high speed. The travel data D[t1] corresponds to a point T1 in the distribution map DM shown in FIG. 3B. The vertical axis of the distribution map DM corresponds to the north-south direction, and the horizontal axis corresponds to the east-west direction. The distance from the origin of the distribution map DM corresponds to the speed vs.

At a time point t2, the own vehicle is moving forward in a north-northeast direction at a relatively low speed. The travel data D[t2] corresponds to a point T2 in the distribution map DM.

At a time point t3, the own vehicle is advancing in the north-northeast direction at an extremely low speed. That is, this situation corresponds to just before the own vehicle stops in order to switch from moving forward to moving backward. The travel data D[t3] corresponds to a point T3 in the distribution map DM.

After that, the own vehicle moves backward and reaches the parking space P0. Therefore, the parking assist ECU 10 does not acquire the travel data D[t] during this period. That is, no new plots are added to the distribution map DM.

The travel data D[t] acquired as described above is stored in (added to) the ROM 10b as the parking log D1. In other words, each point plotted on the distribution map DM (points T1 to T3 in the example of FIG. 3B) is added to the distribution map DM1 representing the parking log D1. The parking log D1 corresponds to the smallest region encompassing all of the points plotted on the distribution map DM1.

Second Example

There is now given description of the pieces of travel data D[t1], D[t2], and D[t3] acquired in the process of the own vehicle advancing along the road R2 toward the parking space P0, entering the parking region PR, and then being parked facing forward in the parking space P0 (a case in which the situation transitions from the first situation to the third situation).

Figure 4A:
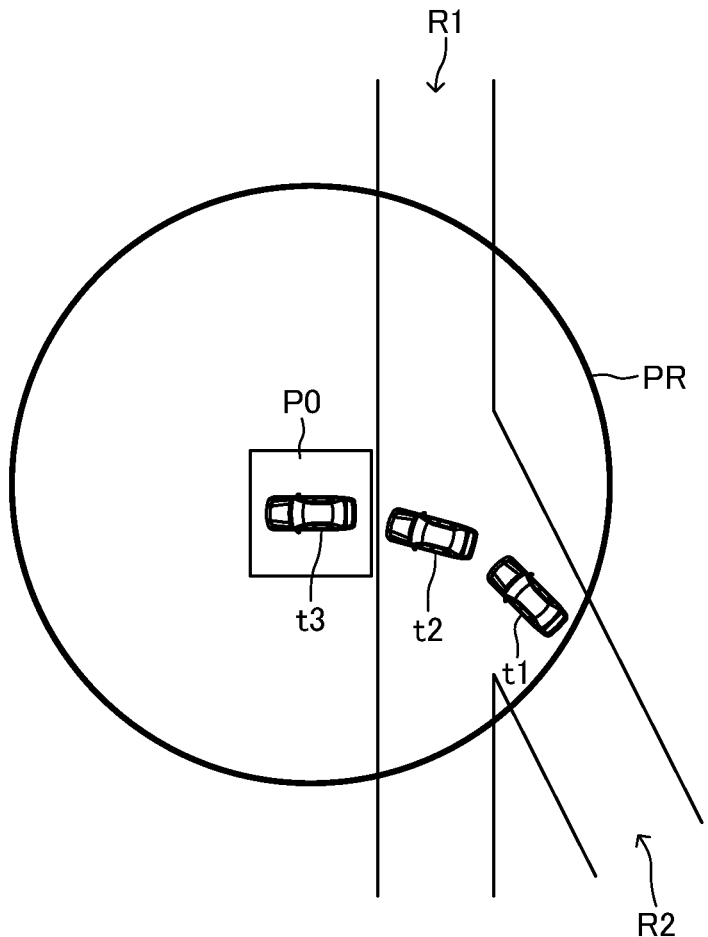
FIG. 4A is a plan view for illustrating another example in which an own vehicle has reached a parking space.

As illustrated in FIG. 4A, at the time point t1 immediately after the own vehicle enters the parking region PR, the own vehicle is moving forward in a northwest direction at a relatively high speed. The travel data D[t1] corresponds to a point T1 in the distribution map DM shown in FIG. 4B.

At the time point t2, the own vehicle is positioned in front (east) of the parking space P0, and is moving forward in a west-northwest direction at a low speed. The travel data D[t2] corresponds to a point T2 in the distribution map DM.

At the time point t3, the own vehicle is advancing in a west direction at an extremely low speed. The travel data D[t3] corresponds to a point T3 in the distribution map DM.

The travel data D[t] acquired as described above is stored in (added to) the ROM 10b as the parking log D1. In other words, each point plotted on the distribution map DM (points T1, T2, and T3 in the example of FIG. 4B) is added to the distribution map DM1.

Third Example

There is now given description of the pieces of travel data D[t1], D[t2], and D[t3] acquired in the process of the own vehicle traveling in a southerly direction from the north of the parking region PR, entering the parking region PR, and exiting the parking region PR to the south without being parked in the parking space P0 (a case in which the situation does not transition from the first situation to the third situation).

Figure 5A:
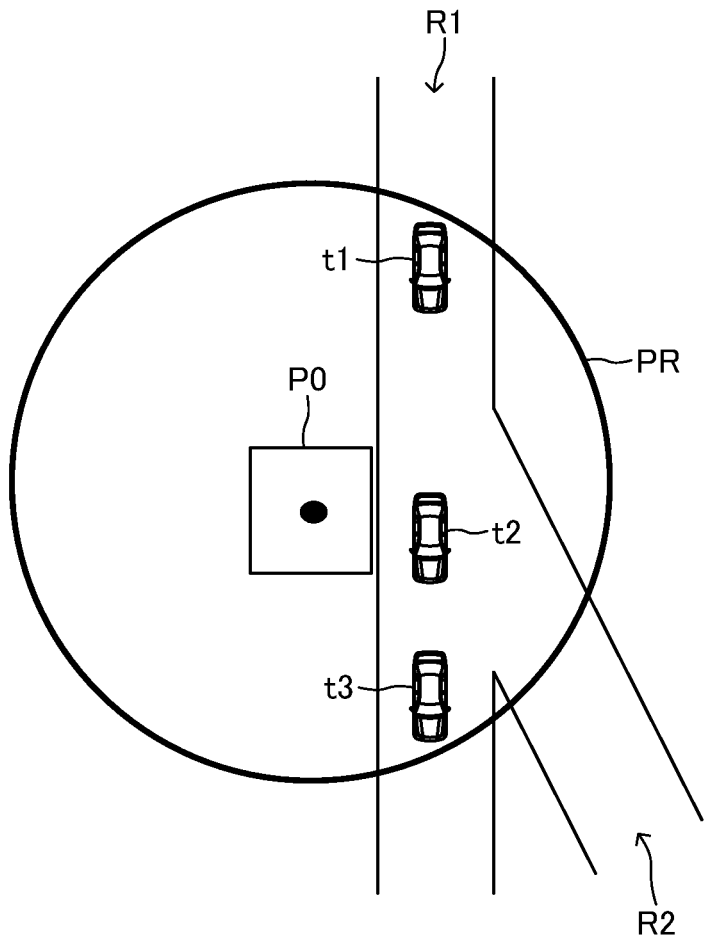
FIG. 5A is a plan view for illustrating an example in which an own vehicle has passed a parking space.
Figure 5B:
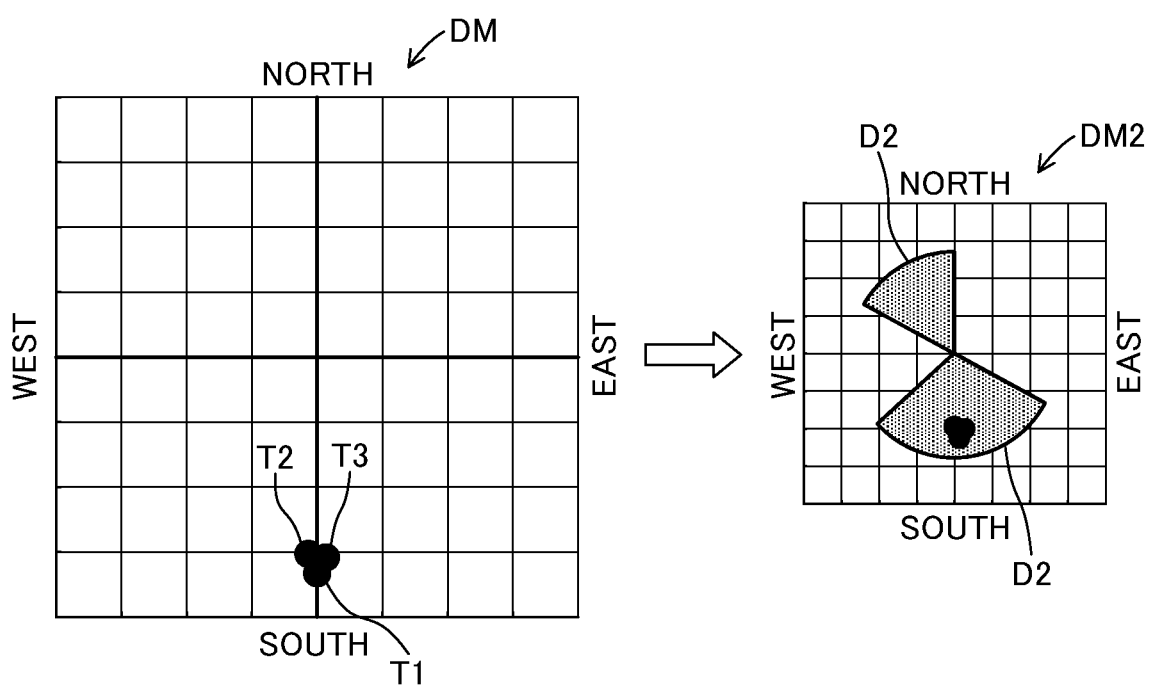
FIG. 5B is a distribution map of travel data and a distribution map of a passage log acquired in the example illustrated in FIG. 5A.

As illustrated in FIG. 5A, from the time point t1 immediately after the own vehicle enters the parking region PR to the time point T3 immediately before the own vehicle exits the parking region PR, the own vehicle is moving forward at a substantially constant speed. The pieces of travel data D[t1], D[t2], and D[t3] correspond to the points T1, T2, and T3 in the distribution map DM shown in FIG. 5B. As shown in FIG. 5B, those points are packed closely together.

The travel data D[t] acquired as described above is stored in (added to) the ROM 10b as the passage log D2. In other words, each point plotted on the distribution map DM (points T1 to T3 in the example of FIG. 5B) is added to the distribution map DM2 representing the passage log D2. The passage log D2 corresponds to the smallest region encompassing all of the points plotted on the distribution map DM2.

Fourth Example

There is now given description of the pieces of travel data D[t1], D[t2], and D[t3] acquired in the process of the own vehicle traveling in the southerly direction from the north of the parking region PR, entering the parking region PR, entering the road R2 from the road R1 without being parked in the parking space P0, and exiting the parking region PR to the southeast (a case in which the situation does not transition from the first situation to the third situation).

Figure 6A:
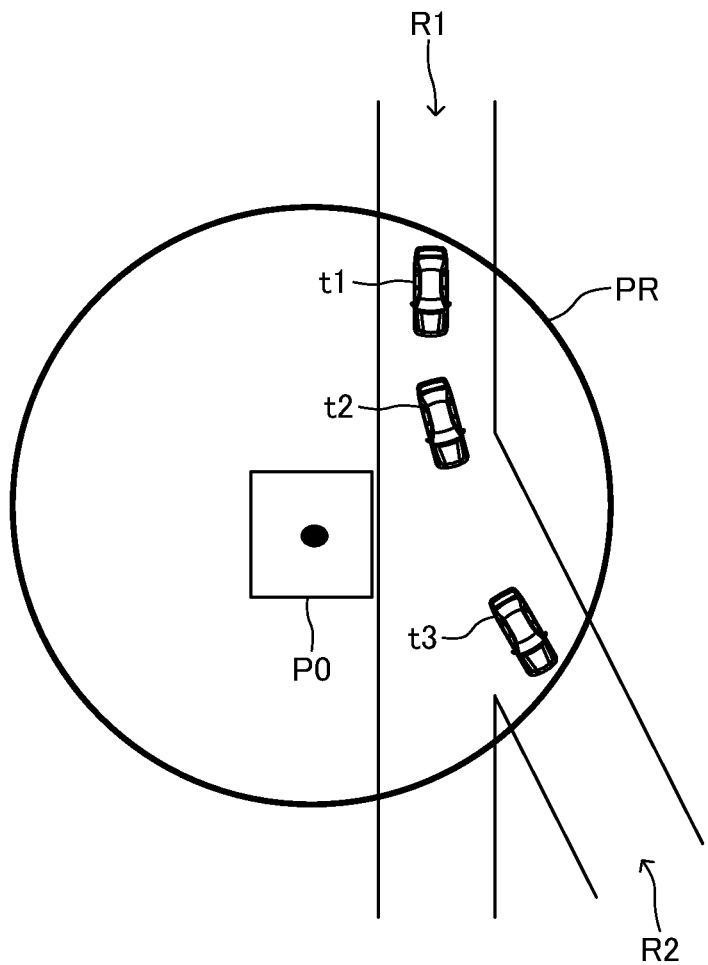
FIG. 6A is a plan view for illustrating another example in which an own vehicle has passed a parking space.

As illustrated in FIG. 6A, at the time point t1 immediately after the own vehicle enters the parking region PR, the own vehicle is moving forward in the southerly direction at a relatively high speed. The travel data D[t1] corresponds to a point T1 in the distribution map DM shown in FIG. 6B.

At the time point t2, the own vehicle is positioned in front (east) of the parking space P0, and is moving forward in a south-east direction at a relatively low speed. The travel data D[t2] corresponds to a point T2 in the distribution map DM.

At the time point t3, the own vehicle is positioned at the edge of the parking region PR, and is moving forward in a southeast direction at a relatively high speed. The travel data D[t3] corresponds to the point T2 in the distribution map DM.

The travel data D[t] acquired as described above is stored in (added to) the ROM 10b as the passage log D2. In other words, each point plotted on the distribution map DM (points T1 to T3 in the example of FIG. 6B) is added to the distribution map DM2.

Figure 3B:
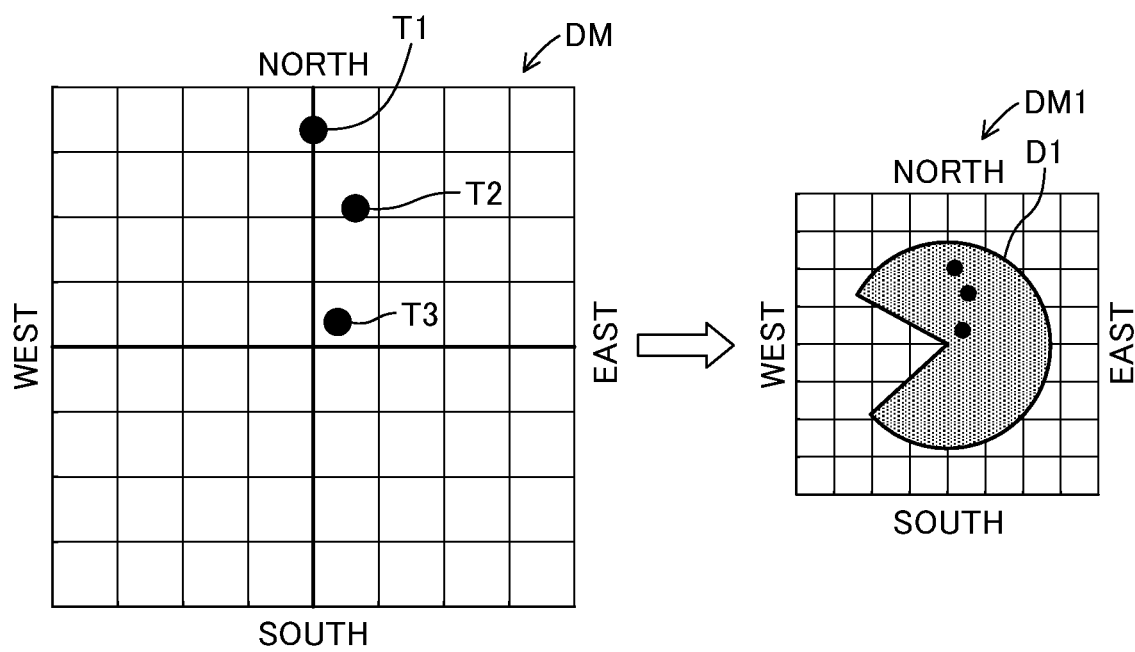
FIG. 3B is a distribution map of travel data and a distribution map of a parking log acquired in the example illustrated in FIG. 3A.
Figure 4B:
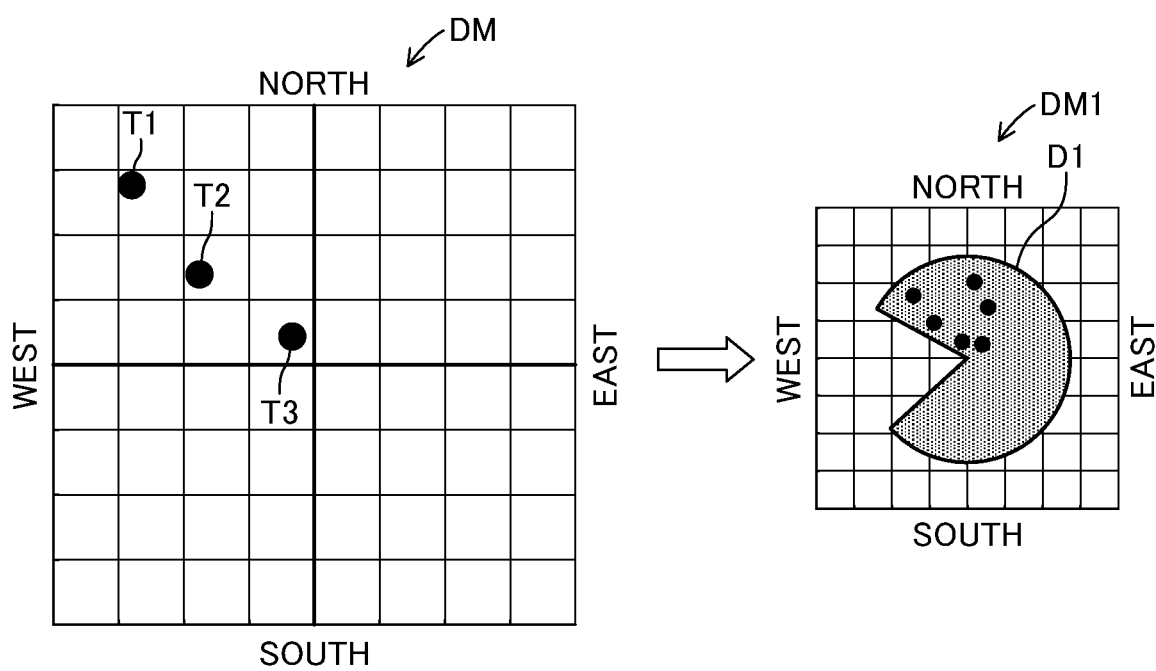
FIG. 4B is a distribution map of travel data and a distribution map of a parking log acquired in the example illustrated in FIG. 4A.
Figure 6B:
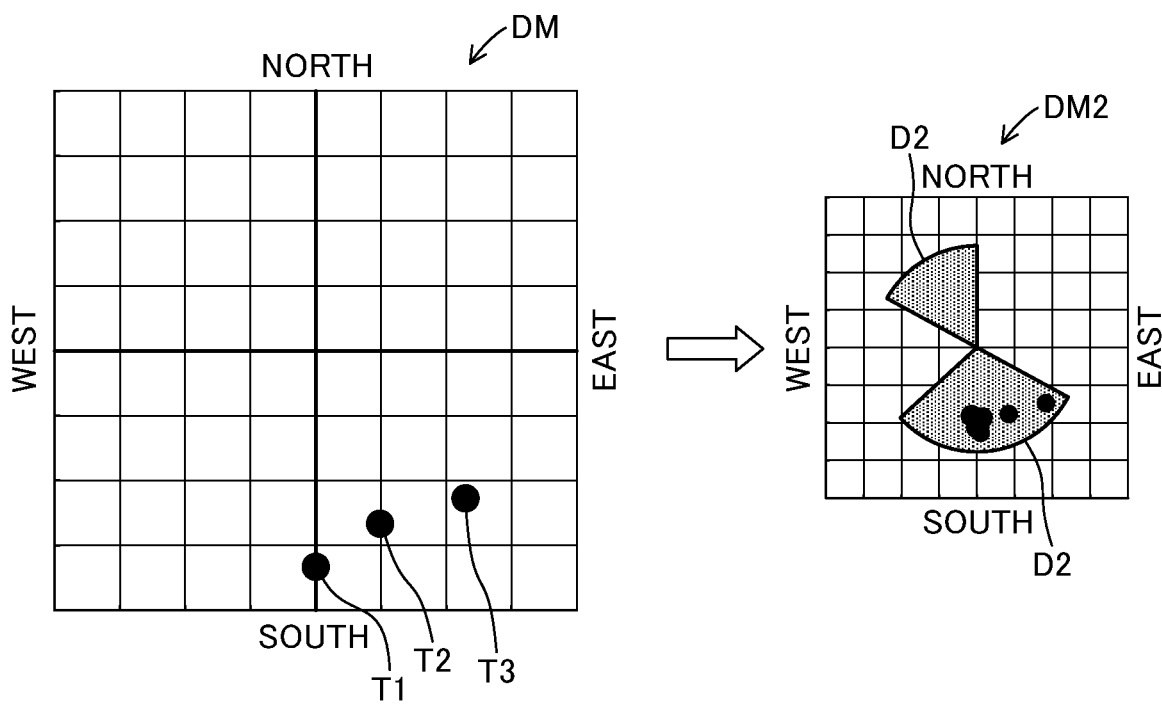
FIG. 6B is a distribution map of travel data and a distribution map of a passage log acquired in the example illustrated in FIG. 6A.

The parking log D1 and the passage log D2 are updated as described above. As a result, in this example, as shown in FIG. 3B and FIG. 4B, in the distribution map DM1, the parking log D1 changes from a region having a circular shape to a region having a shape in which a part of the western side is removed (fan-shaped region extending from the southwest to the northwest). Further, as shown in FIG. 5B and FIG. 6B, in the distribution map DM2, the passage log D2 has a fan shape extending from the north or northwest and a fan shape extending from the southeast to the south.

Histogram Generation

Figure 7A:
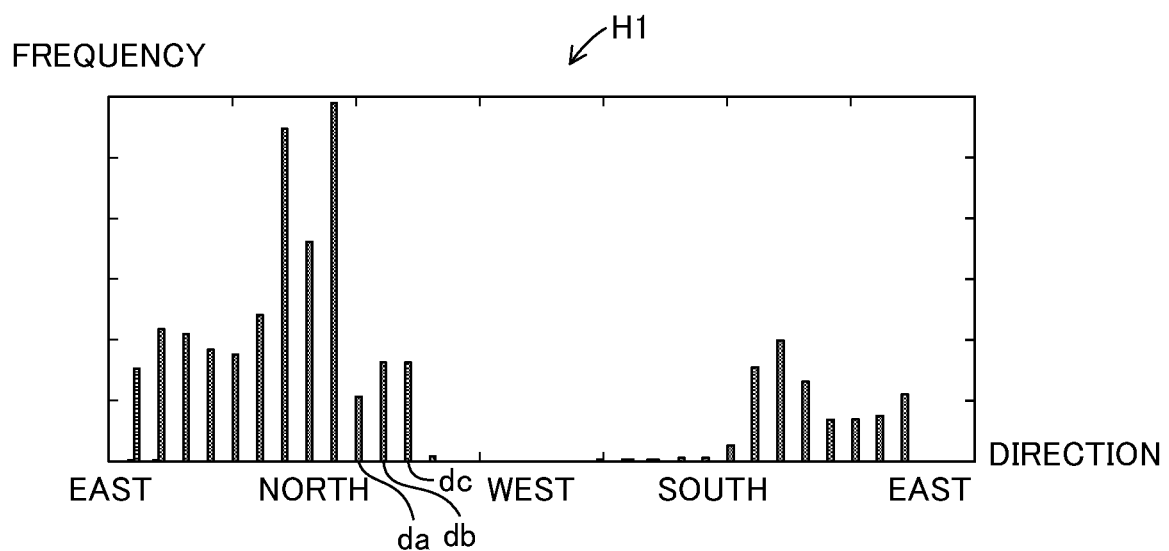
FIG. 7A is a histogram of a parking log.

The parking assist ECU 10 counts the number of times the own vehicle is parked in the parking space P0 (hereinafter referred to as "parking count N"). When the parking count N exceeds a threshold value Nth (for example, "50"), as shown in FIG. 7A, based on the parking log D1, the parking assist ECU 10 generates a histogram H1 of the directions in which the own vehicle is moving forward at each time point "t" from when the own vehicle enters the parking region PR until the own vehicle is parked (until the parking operation by the driver is complete). That is, the horizontal axis of the histogram H1 corresponds to direction, and the vertical axis of the histogram H1 corresponds to the number of times (frequency) that the own vehicle advanced in each direction. In the generation of the histogram H1, only the direction α of the data forming the travel data D[t] is used, and the speed vs is not used. That is, the frequency of each direction α corresponds to the number of plots (points) located on a straight line radially extending from the center in the distribution map DM1.

Figure 7B:
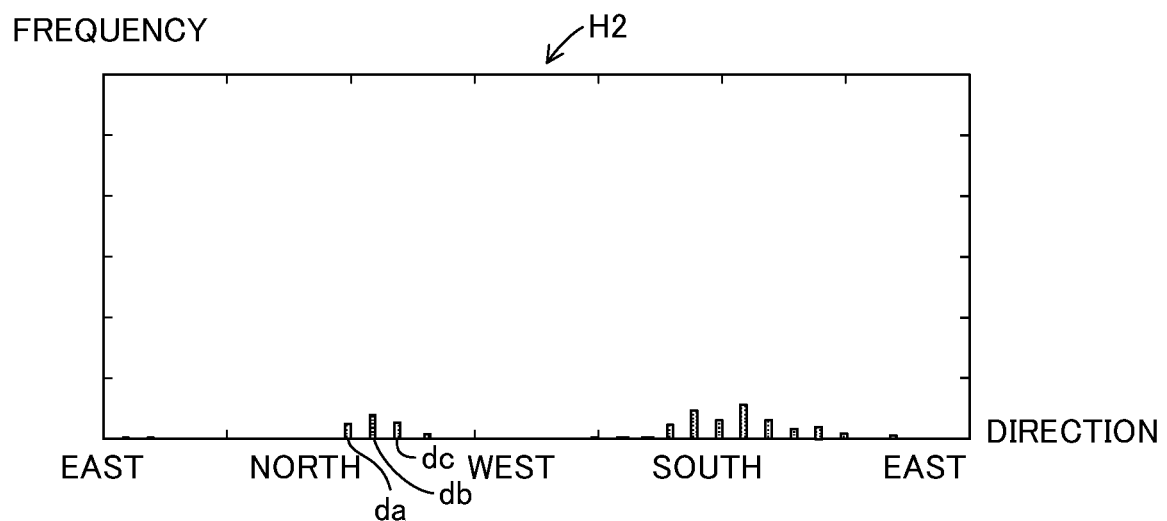
FIG. 7B is a histogram of a passage log.

Further, as shown in FIG. 7B, based on the passage log D2, the parking assist ECU 10 generates a histogram H2 of the directions in which the own vehicle advanced at each time point "t" from when the own vehicle enters the parking region PR until the own vehicle exits the parking region PR without being parked. That is, the horizontal axis of the histogram H2 corresponds to direction, and the vertical axis of the histogram H2 corresponds to the number of times (frequency) that the own vehicle advanced in each direction. In the generation of the histogram H2, only the direction α of the data forming the travel data D[t] is used, and the speed vs is not used. That is, the frequency of each direction α corresponds to the number of plots located on a straight line radially extending from the center in the distribution map DM2.

Generation of Parking Operation Determination Map

Figure 8:
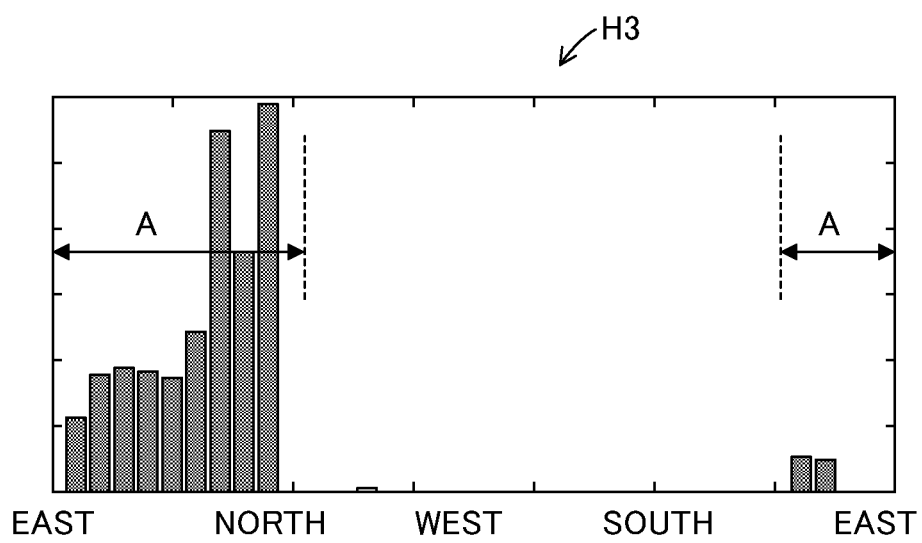
FIG. 8 is a parking operation determination map (histogram).
Figure 9:
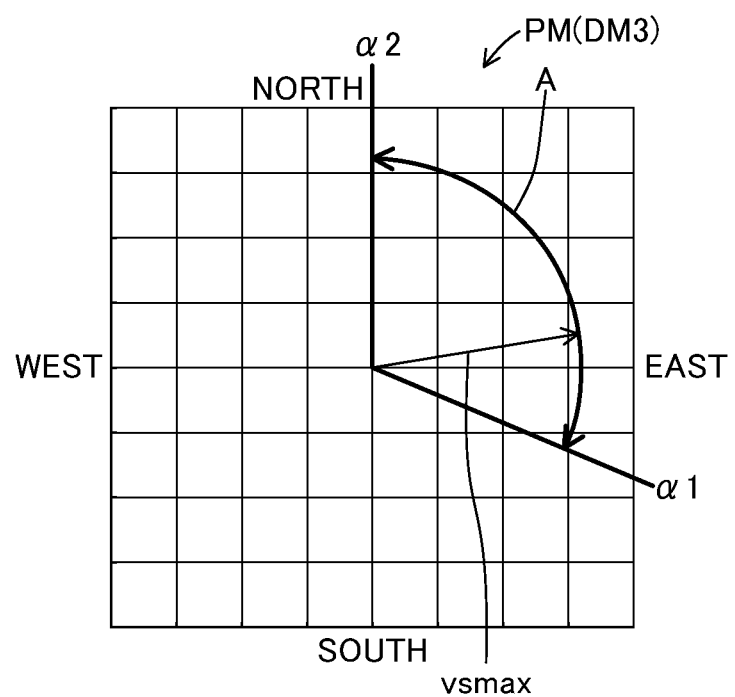
FIG. 9 is a parking operation determination map (having a polar coordinate format).

The parking assist ECU 10 weights (multiplies by a predetermined value) the frequency of each direction α forming the histogram H2. Next, the parking assist ECU 10 subtracts the frequency of each direction α forming the histogram H2 after execution of the weighting from the frequency of each direction α forming the histogram H1. In this way, for example, a histogram H3 shown in FIG. 8 is obtained. When the frequency is a negative value as a result of the calculation, the frequency is set to "0." In the histogram H3, a range A of the direction α having a frequency of "1" or more corresponds to a range A (α1≤α≤α2) in the distribution map DM3 having a polar coordinate format shown in FIG. 9. The radius (speed vs) of the circular arc portion in FIG. 9 corresponds to a maximum speed vsmax among the travel data D[t] forming the parking log D1. The distribution map DM3 obtained in this manner is used as a parking operation determination map PM in the operation mode switching control described below. The parking operation determination map PM shown in FIG. 9 is an example, and the shape and size of the range A are determined in accordance with the positional relationship between the parking region PR and the surrounding roads, the configuration of the roads (such as straight roads, curved roads, and branch roads), and the characteristics of the driving operation of the driver.

Operation Mode Switching Control

The parking assist ECU 10 sequentially detects the current position of the own vehicle based on the information acquired from the in-vehicle sensors 20. When the own vehicle is positioned outside the parking region PR, the parking assist ECU 10 sets the operation mode to "prohibited mode."

When the own vehicle is positioned inside (including on the boundary of) the parking region PR, the parking assist ECU 10 determines whether the own vehicle is moving forward or backward based on the information acquired from the in-vehicle sensors 20. When the own vehicle is moving backward, the parking assist ECU 10 sets the operation mode to "permitted mode." That is, even when the driver erroneously depresses the accelerator pedal excessively, the own vehicle hardly accelerates.

When the own vehicle is moving forward, the parking assist ECU 10 estimates whether or not the driver is performing a parking operation (is performing an operation of entering or exiting the parking space) in the manner described later, and switches operation modes in accordance with the result of the estimation. Specifically, the parking assist ECU 10 detects the direction in which the own vehicle is moving forward based on the information acquired from the in-vehicle sensors 20. When the detected direction is included in the range A of the parking operation determination map PM, the parking assist ECU 10 estimates that "the driver is performing a parking operation," and sets the operation mode to "permitted mode." Meanwhile, when the detected direction is not included in the range A of the parking operation determination map PM (when the detected direction is outside the range A), and a distance Δd for which the own vehicle has moved forward since the own vehicle started moving exceeds a predetermined threshold value Δdth, it can be safely assumed that the driver is intentionally accelerating the own vehicle. Such a situation may occur, for example, when the own vehicle is exiting the parking space, or when the driver terminates the parking operation halfway through the operation and tries to exit the parking region PR. In such cases, the parking assist ECU 10 estimates that "the driver is not performing a parking operation," and sets the operation mode to "prohibited mode". That is, when the driver deeply depresses the accelerator pedal, the own vehicle accelerates quickly. Note that, even in the case in which the detected direction is outside the range A, the parking assist ECU 10 sets the operation mode to "permitted mode" when the distance Δd is equal to or less than the threshold value Δdth.

Figure 10:
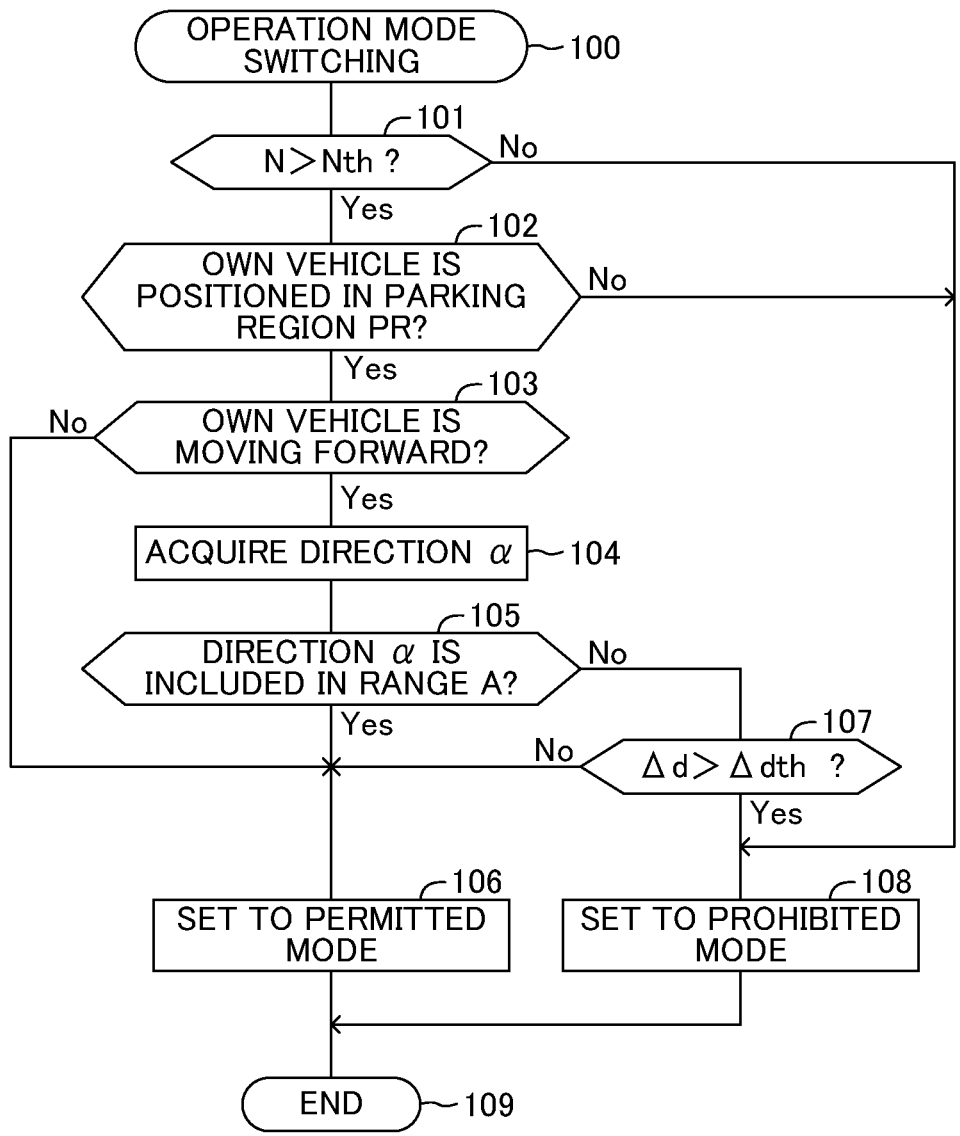
FIG. 10 is a flowchart of an operation mode switching program.

Next, operation of the CPU 10a (hereinafter simply referred to as "CPU") of the parking assist ECU 10 (operation mode switching program for implementing the above-mentioned operation mode switching control) is specifically described with reference to FIG. 10. When an engine of the own vehicle is started, the CPU repeatedly executes the operation mode switching program at predetermined time intervals. Moreover, immediately after the engine of the own vehicle is started, the operation mode is initialized to "prohibited mode."

When operation mode switching processing starts from Step 100, the CPU advances the process to Step 101.

In Step 101, the CPU determines whether or not the parking count N exceeds the threshold value Nth. As described above, when the parking count N is equal to or less than the threshold value Nth, the parking operation determination map PM has not yet been generated, and hence it cannot be estimated whether or not a parking operation is in progress. Therefore, when the parking count N is equal to or less than the threshold value Nth ("No" in Step 101), the CPU advances the process to Step 108 described later. Meanwhile, when the parking count N exceeds the threshold value Nth ("Yes" in Step 101), the CPU advances the process to Step 102.

In Step 102, the CPU determines whether or not the own vehicle is positioned inside the parking region PR. When the own vehicle is positioned within the parking region PR ("Yes" in Step 102), the CPU advances the process to Step 103. Meanwhile, when the own vehicle is positioned outside the parking region PR ("No" in Step 102), the CPU advances the process to Step 108.

In Step 103, the CPU determines whether or not the own vehicle is moving forward. When the own vehicle is moving forward ("Yes" in Step 103), the CPU advances the process to Step 104. Meanwhile, when the own vehicle is not moving forward (is stopped or moving backward) ("No" in Step 103), the CPU advances the process to Step 106 described later.

In Step 104, the CPU acquires (detects) the direction α in which the own vehicle is moving forward. The CPU then advances the process to Step 105.

In Step 105, the CPU estimates whether or not a parking operation is in progress. That is, the CPU determines whether or not the detected direction α is included in the range A of the parking operation determination map PM. When the direction α is included in the range A ("Yes" in Step 105), the CPU estimates that "parking operation is in progress," and advances the process to Step 106. Meanwhile, when the direction α is not included in the range A ("No" in Step 105), the CPU estimates that "a parking operation is not in progress," and advances the process to Step 107.

In Step 106, the CPU sets the operation mode to "permitted mode," advances the process to Step 109, and ends the operation mode switching processing.

In Step 107, the CPU determines whether or not the travel distance Δd exceeds the threshold value Δdth. When the travel distance Δd exceeds the threshold value Δdth ("Yes" in Step 107), the CPU advances the process to Step 108. Meanwhile, when the travel distance Δd is equal to or less than the threshold value Δdth ("No" in Step 107), the CPU advances the process to Step 106.

In Step 108, the CPU sets the operation mode to "prohibited mode," and then advances the process to Step 109.

Even in the case in which the detected direction α is included in the range A, the CPU may set the operation mode to "prohibited mode" when the speed vs exceeds the maximum speed vsmax.

Effects

The range A of the parking operation determination map PM described above represents the range of directions in which there is a statistically high possibility that the own vehicle is moving forward during a parking operation. Therefore, in a case in which the direction α when the own vehicle is moving forward in the parking region PR is included in the range A of the parking operation determination map PM, the control device estimates that "the driver is currently performing a parking operation," and permits execution of acceleration suppression control. Conversely, in a case in which the direction α when the own vehicle is moving forward in the parking region PR is not included in the range A, the control device estimates, in principle, that "the driver is currently not performing a parking operation," and prohibits execution of acceleration suppression control. As described above, the parking assist apparatus 1 can switch between the state in which acceleration suppression control can be executed and the state in which acceleration suppression control cannot be executed in accordance with the situation. Therefore, the parking assist apparatus 1 is more practical than the related-art apparatus in which acceleration suppression control is executed simply based on the depression depth of the accelerator pedal regardless of the situation of the own vehicle.

The present invention is not limited to the at least one embodiment described above, and as described below, various modification examples can be adopted within the scope of the present invention.

Modification Example 1

Figure 11:
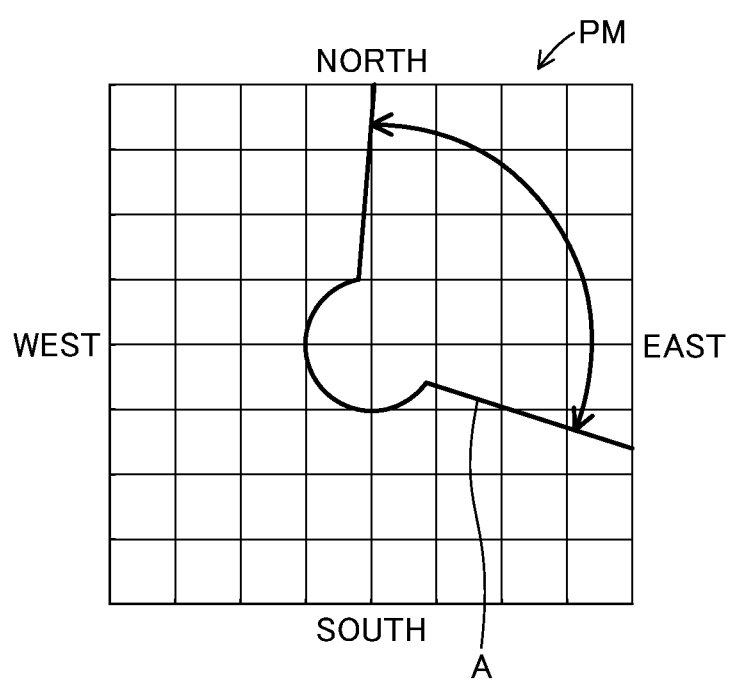
FIG. 11 is a parking operation determination map in a modification example of the present invention.

When the operation mode is "permitted mode," the range A may be extended as shown in FIG. 11. That is, the acceleration suppression apparatus may be configured such that, when the own vehicle is traveling at an extremely low speed, the operation mode is not switched from "permitted mode" to "prohibited mode" regardless of the direction of the travel.

Modification Example 2

Figure 12A:
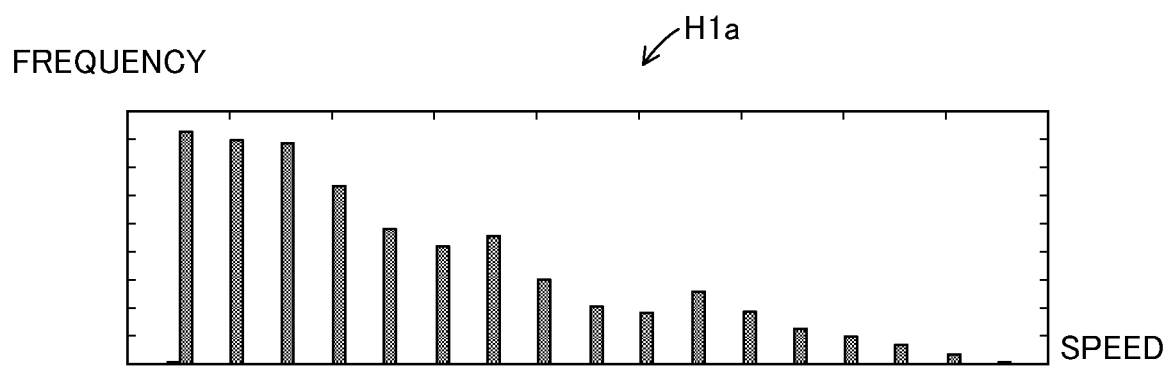
FIG. 12A is a histogram for representing a speed distribution when the own vehicle is moving forward in a north-northwest direction during a process until the own vehicle is parked in the parking space.
Figure 12B:
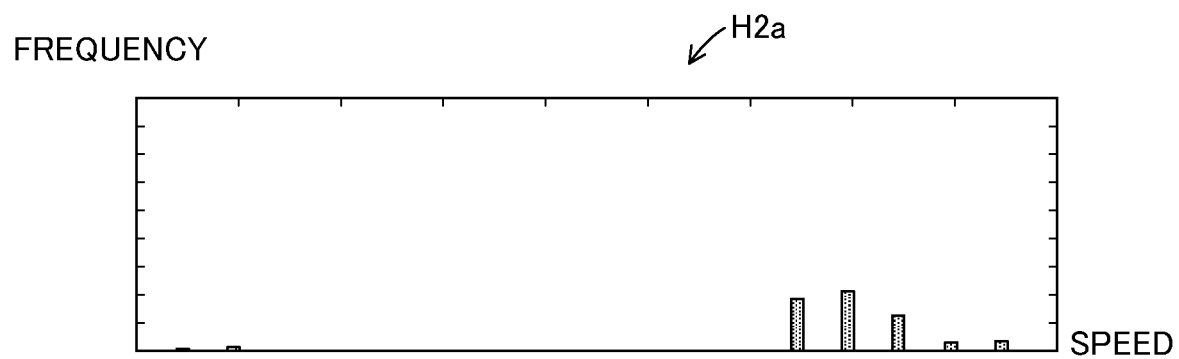
FIG. 12B is a speed distribution map when the own vehicle is moving forward in the north-northwest direction in a process of passing the parking space.

The above-mentioned parking log D1 and passage log D2 may overlap. For example, as shown in FIG. 7A and FIG. 7B, when the frequency of regions (αa, αb, αc) extending from north to north-northwest of the parking log D1 is "1" or more, and the frequency of the same regions (αa, αb, αc) of the passage log D2 is equal to or greater than "1", the parking assist ECU 10 generates histograms H1*a* (FIG. 12A), H1*b*, and H1*c* of the speed vs of the travel data D in which the direction α matches the directions αa, αb, and αc in the parking log D1, respectively. The parking assist ECU 10 also generates histograms H2*a* (FIG. 12B), H2*b*, and H2*c* of the speed vs of the travel data D in which the direction α matches the directions αa, αb, and αc in the passage log D2, respectively.

Figure 13A:
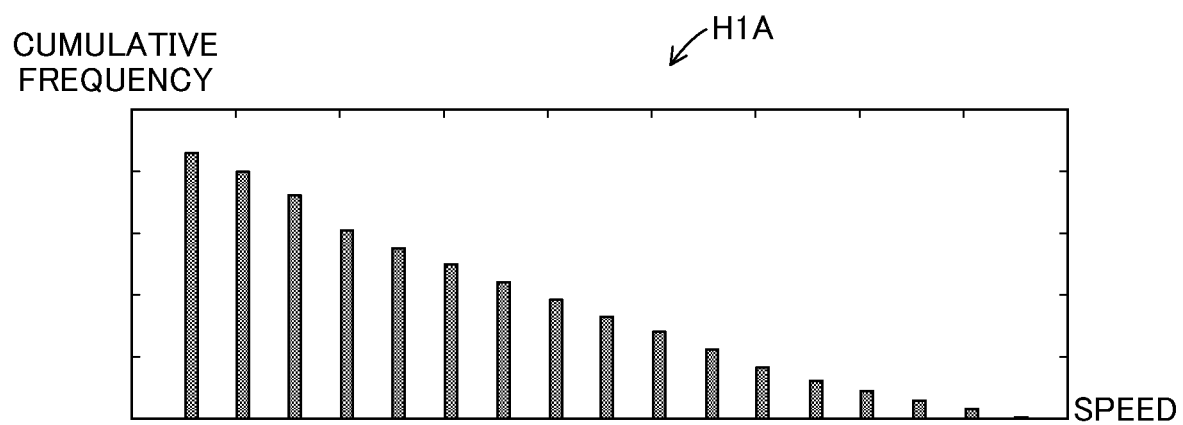
FIG. 13A is a cumulative frequency distribution map of FIG. 12A.
Figure 13B:
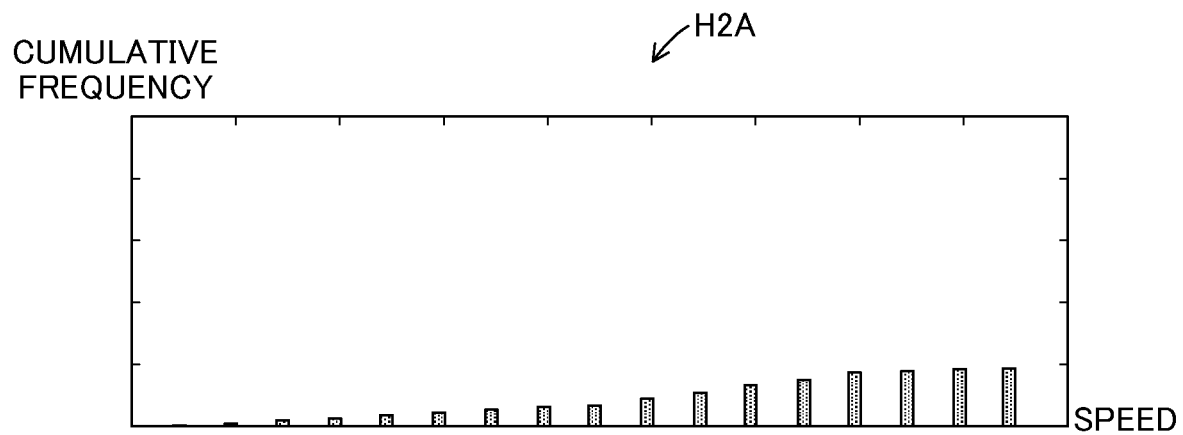
FIG. 13B is a cumulative frequency distribution map of FIG. 12B.
Figure 14:
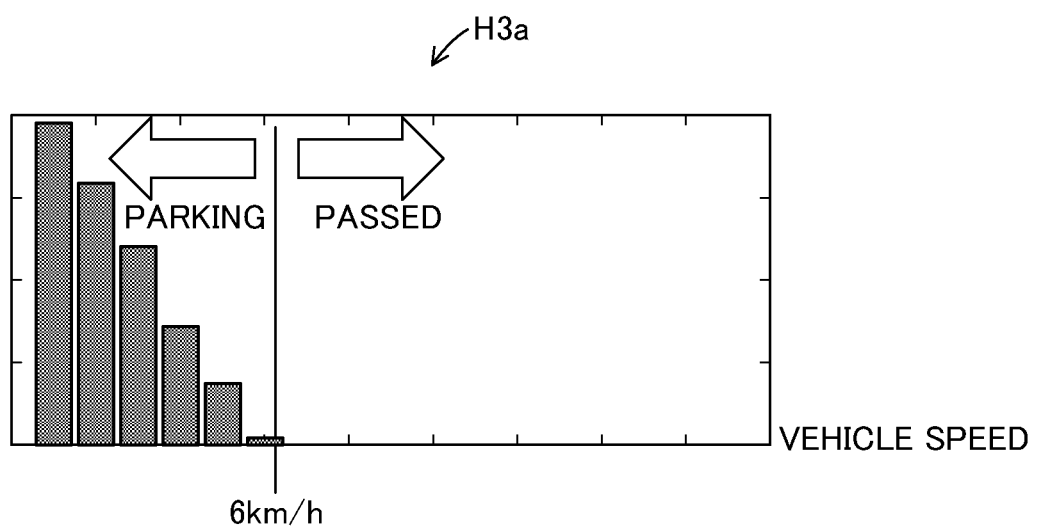
FIG. 14 is a histogram for determining whether or not a driving operation when the own vehicle moved forward in the north-northwest direction is a parking operation.

Next, as shown in FIG. 13A, the parking assist ECU 10 creates a cumulative frequency distribution map H1A by accumulating each frequency from the higher speeds vs of the histogram H1*a*. Further, as shown in FIG. 13B, the parking assist ECU 10 creates a cumulative frequency distribution map H2A by accumulating each frequency from the lowest speeds vs of the histogram H2*a*. Then, the parking assist ECU 10 weights the cumulative frequency of each class of the cumulative frequency distribution map H2A (for example, multiplies the cumulative frequency of each class by 10). Then, the parking assist ECU 10 subtracts the cumulative frequency of each class of the weighted cumulative frequency distribution map H2A from the cumulative frequency of each class of the cumulative frequency distribution map H1A. As a result, a cumulative frequency distribution map H3*a* shown in FIG. 14 is obtained. From this cumulative frequency distribution map H3*a*, a parking operation can be estimated as being in progress when the speed is 6 km/h or less.

The parking assist ECU 10 calculates, based on the histograms H1*b*, H2*b*, H1*c*, and H2*c*, a cumulative frequency distribution map H3*b* and a cumulative frequency distribution map H3*c* (not shown) in the same manner as the cumulative frequency distribution map H3*a*. In this example, it has been found from the cumulative frequency distribution maps H3*b* and H3*c* that it is possible to estimate that a parking operation is in progress when the speed is 6 km/h or less.

Figure 15:
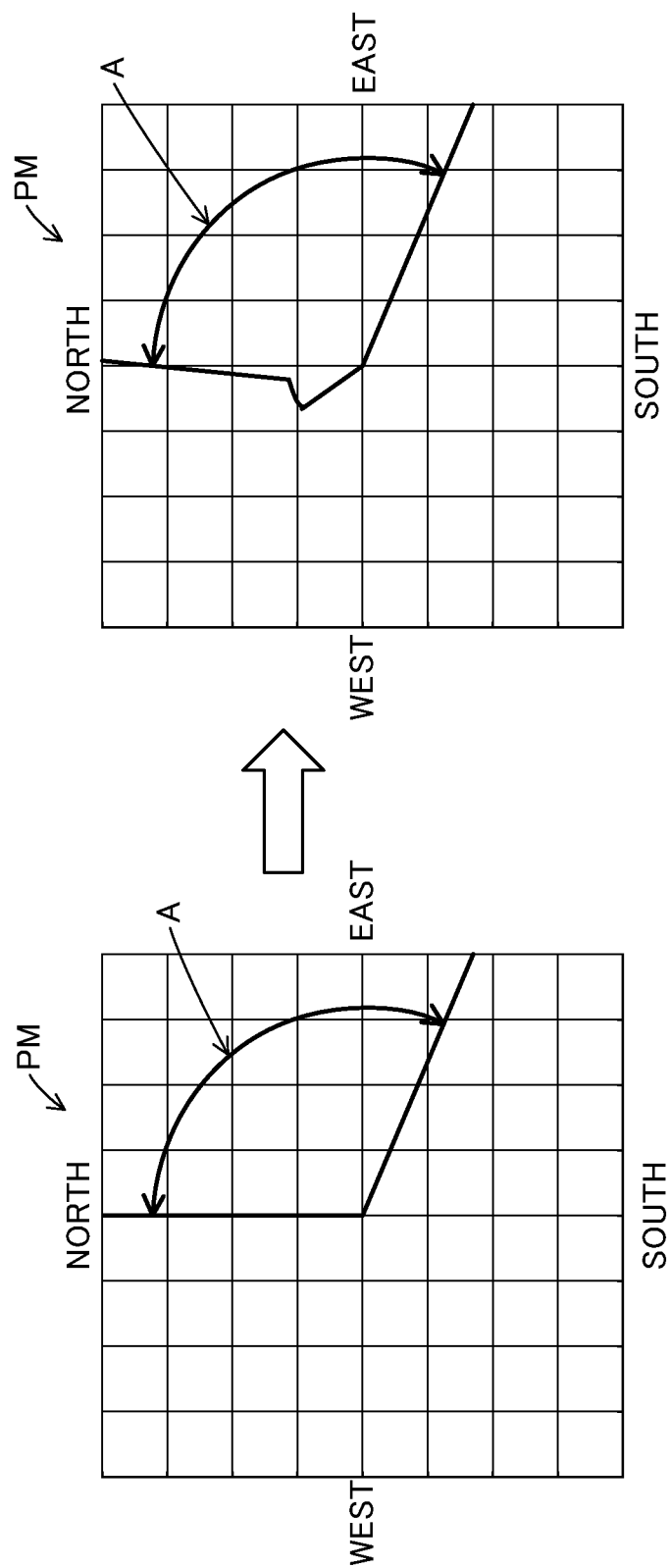
FIG. 15 is a parking operation determination map obtained by using the histogram of FIG. 14 to correct the parking operation determination map of FIG. 9.

In this way, when the own vehicle is moving forward in directions αa, αb, and αc, it is estimated that there is a high possibility that a parking operation is in progress (second situation) when the speed vs is in a relatively low range. Thus, it is preferred that the parking operation determination map PM of FIG. 9 be modified as shown in FIG. 15.

The vehicle V may be an autonomous vehicle.

What is claimed is:

1. An acceleration suppression apparatus, comprising:
an in-vehicle sensor configured to acquire information relating to a position of an own vehicle and information relating to an operation of an operating element of the own vehicle to output the acquired information; and
a processor configured to:
execute, based on the information acquired from the in-vehicle sensor, acceleration suppression control for suppressing acceleration of the own vehicle by controlling at least one of an actuator or a brake mounted on the own vehicle;
execute the acceleration suppression control when, in a situation in which the own vehicle is positioned in a predetermined region including a parking space, a traveling mode of the own vehicle matches a predetermined mode defined in advance as a traveling mode when the own vehicle is being parked in the parking space;
store a distribution map of a direction in which the own vehicle is advancing when the own vehicle is being parked in the predetermined region and a speed of the own vehicle in the predetermined region, the distribution map being a map indicating the direction and the speed of the own vehicle at predetermined time points;
execute the acceleration suppression control when at least one of a current direction in which the own vehicle is advancing and a current speed of the own vehicle which are acquired from the in-vehicle sensor are included in a predetermined range of the distribution map; and
generate the distribution map based on a history of the direction in which the own vehicle is advancing in the predetermined region and the speed of the own vehicle traveling in the predetermined region.

2. The acceleration suppression apparatus according to claim 1, wherein the distribution map is a map in which a vertical axis corresponds to a north-south direction, a horizontal axis corresponds to an east-west direction, and a distance from an origin corresponds to the speed of the own vehicle.

3. The acceleration suppression apparatus according to claim 1, wherein the in-vehicle sensor is further configured to acquire the information relating to the operation of the direction and the speed of the own vehicle when the own vehicle is advancing in a forward direction.

4. An acceleration suppression method, comprising:
acquiring information relating to a position of an own vehicle and information relating to an operation of an operating element of the own vehicle; and
permitting, based on the information acquired, suppression of acceleration of the own vehicle by controlling at least one of an actuator or a brake mounted on the own vehicle, the permitting of suppression of acceleration being executed when, in a situation in which the own vehicle is positioned in a predetermined region including a parking space, a traveling mode of the own vehicle matches a predetermined mode defined in advance as a traveling mode when the own vehicle is being parked in the parking space;
storing a distribution map of a direction in which the own vehicle is advancing when the own vehicle is being parked in the predetermined region and a speed of the own vehicle in the predetermined region, the distribution map being a map indicating the direction and the speed of the own vehicle at predetermined time points;
executing the acceleration suppression control when at least one of a current direction in which the own vehicle is advancing and a current speed of the own vehicle which are acquired from the in-vehicle sensor are included in a predetermined range of the distribution map; and
generating the distribution map based on a history of the direction in which the own vehicle is advancing in the predetermined region and the speed of the own vehicle traveling in the predetermined region.

5. A non-transitory computer-readable storage medium having stored thereon a computer program which, when executed, implements a method comprising:
- acquiring information relating to a position of an own vehicle and information relating to an operation of an operating element of the own vehicle; and
- permitting, based on the information acquired, suppression of acceleration of the own vehicle by controlling at least one of an actuator or a brake mounted on the own vehicle, the permitting of suppression of acceleration being executed when, in a situation in which the own vehicle is positioned in a predetermined region including a parking space, a traveling mode of the own vehicle matches a predetermined mode defined in advance as a traveling mode when the own vehicle is being parked in the parking space;
- storing a distribution map of a direction in which the own vehicle is advancing when the own vehicle is being parked in the predetermined region and a speed of the own vehicle in the predetermined region, the distribution map being a map indicating the direction and the speed of the own vehicle at predetermined time points;
- executing the acceleration suppression control when at least one of a current direction in which the own vehicle is advancing and a current speed of the own vehicle which are acquired from the in-vehicle sensor are included in a predetermined range of the distribution map; and
- generating the distribution map based on a history of the direction in which the own vehicle is advancing in the predetermined region and the speed of the own vehicle traveling in the predetermined region.

* * * * *